(12) United States Patent
Musser, Jr. et al.

(10) Patent No.: US 12,448,222 B2
(45) Date of Patent: Oct. 21, 2025

(54) APPARATUS FOR MANUFACTURING WITH OVERHEAD CONVEYOR AND PINCH CONVEYOR

(71) Applicant: Oakwood Industries, LLC, Memphis, MO (US)

(72) Inventors: Alvin M. Musser, Jr., Memphis, MO (US); Gerald Oberholtzer, Rutledge, MO (US); Kent Lee Nolt, Wellman, IA (US)

(73) Assignee: Oakwood Industries, LLC, Memphis, MO (US)

( * ) Notice: Subject to any disclaimer, the term of this patent is extended or adjusted under 35 U.S.C. 154(b) by 231 days.

(21) Appl. No.: 18/521,877

(22) Filed: Nov. 28, 2023

(65) Prior Publication Data
US 2025/0171245 A1    May 29, 2025

(51) Int. Cl.
B65G 47/24        (2006.01)
B65G 17/20        (2006.01)

(52) U.S. Cl.
CPC ............. *B65G 47/24* (2013.01); *B65G 17/20* (2013.01); *B65G 2201/02* (2013.01)

(58) Field of Classification Search
CPC ........ B65G 17/20; B65G 47/24; B24B 41/005
USPC ................................................. 414/758, 759
See application file for complete search history.

(56) References Cited

U.S. PATENT DOCUMENTS

| | | | | |
|---|---|---|---|---|
| 3,589,532 A | * | 6/1971 | Filkins .................. | B65G 47/252 414/759 |
| 3,908,316 A | * | 9/1975 | Retteu ..................... | B24B 21/04 451/300 |
| 4,353,675 A | * | 10/1982 | Risener ................... | B65B 55/24 414/744.8 |
| 4,573,863 A | * | 3/1986 | Picotte .................. | B65G 47/252 414/763 |
| 4,798,278 A | * | 1/1989 | Cornacchia .......... | B65G 47/252 414/773 |
| 4,921,387 A | * | 5/1990 | Bennington ......... | B21D 43/105 414/758 |

(Continued)

FOREIGN PATENT DOCUMENTS

| | | |
|---|---|---|
| CN | 106181759 B | 1/2018 |
| CN | 110842677 A | 2/2020 |

(Continued)

OTHER PUBLICATIONS

US 2004/0197184 A1, Sugiyama et al., Oct. 7 (Year: 2004).*

(Continued)

*Primary Examiner* — Douglas A Hess
(74) *Attorney, Agent, or Firm* — Goodhue, Coleman & Owens, P.C.

(57) ABSTRACT

An apparatus for use in manufacturing includes a support structure, a loading conveyor, an overhead conveyor, and a pinch conveyor. The apparatus provides for an auto-return of an item being processed in a manufacturing process by conveying the item upward with the loading conveyor, conveying the item across the support structure with the overhead conveyor, lowering and flipping the item with the pinch conveyor in order to feed the item into the processing machine. The process may then be repeated to process an opposite face of the item. One use is in furniture manufacturing where both sides of a board or panel require sanding.

20 Claims, 5 Drawing Sheets

(56) References Cited

U.S. PATENT DOCUMENTS

| | | | | |
|---|---|---|---|---|
| 6,817,828 B2* | 11/2004 | Worrel | ................ | B65G 1/1373 |
| | | | | 414/788.7 |
| 8,444,364 B2* | 5/2013 | Blonigan | .......... | H01J 37/32733 |
| | | | | 414/221 |
| 9,803,793 B2* | 10/2017 | Davi | ...................... | F01D 25/28 |
| 9,856,047 B2* | 1/2018 | Ford | ...................... | B65B 69/00 |
| 10,752,452 B1* | 8/2020 | Troesser | ................ | B65G 57/32 |
| 12,168,576 B2* | 12/2024 | Andreasi | ............. | B65G 47/086 |

FOREIGN PATENT DOCUMENTS

| | | | |
|---|---|---|---|
| CN | 112720124 A | | 4/2021 |
| CN | 111318930 B | | 10/2021 |
| CN | 214445151 U | | 10/2021 |

OTHER PUBLICATIONS

Quick CNC, https://www.quick-cnc.com/news/video_264171/custom_solution/lbx1515zlh_cnc_5_axis_filter_plate_machining_center.html, publication date:N/A, 1 Page.

* cited by examiner

APPARATUS FOR MANUFACTURING WITH OVERHEAD CONVEYOR AND PINCH CONVEYOR

FIELD OF THE INVENTION

The present disclosure relates to manufacturing. More particularly, but not exclusively, the present disclosure relates to methods, apparatus, and system for an auto-return which allows an item to be flipped such as may be used in a furniture manufacturing process.

BACKGROUND

To provide background for the present disclosure, problems in the art will be discussed in the context of furniture manufacturing, however, the present disclosure is not to be limited to this context but has various other applications in manufacturing.

In furniture manufacturing, one common operation is sanding both sides of a generally planar item such as a board or panel which will be used in at least one item of furniture. A sander or sanding machine may be used with an operator feeding the board or panel through the sanding machine. However, the operator must retrieve the board from the other side of the machine, inspect it, turn it over and feed the board or panel through the sanding machine again so that both sides of the board are sanded and inspected. Such a process is time-consuming and so places additional limitations on the throughput of the sanding machine.

Therefore, in practice a two-person team may work together on opposite sides of the sanding machine to accomplish this task. However, this results in a labor intensive task and increases the costs of furniture production. What is needed are methods, systems, and apparatus for reducing the labor and costs involved and increasing the speed of the process.

SUMMARY

Therefore, it is a primary object feature, or advantage of the present disclosure to improve over the state of the art.

It is a further object, feature, or advantage of the present disclosure to provide a manufacturing system which reduces manual labor associated with an item which is to be passed through a processing machine (such as a sanding machine) once and then again after being flipped.

It is a still further object, feature, or advantage of the present disclosure to reduce manual labor by automatically conveying an item and automatically flipping it.

Another object, feature, or advantage of the present disclosure is to provide a system which can be retrofitted to existing processing machines.

Yet another object, feature, or advantage of the present disclosure is to provide a system which has a small footprint as manufacturing spaces may be limited in size.

Yet another object, feature, or advantage is to provide an apparatus which promotes safety.

A further object, feature, or advantage is to provide an apparatus and system which allows a single operator to inspect both sides of an item (such as a board or panel) without moving to opposite sides of a processing machine (such as a sanding machine).

One or more of these and/or other objects, features, or advantages of the present disclosure will become apparent from the specification and claims that follow. No single aspect need provide each and every object, feature, or advantage. Different aspects may have different objects, features, or advantages. Therefore, the present disclosure is not to be limited to or by any objects, features, or advantages stated herein.

According to one aspect, an apparatus for use in manufacturing includes a support structure having a first end and a second end opposite the first end. The support structure is configured for positioning over a processing machine which is used for processing an item having a first surface and an opposite second surface wherein both the first surface and the opposite second surface of the item are to be processed with the processing machine in separate passes through the processing machine. The apparatus further includes a loading conveyor positioned at the first end of the support structure associated with an input feed of the processing machine to receive the planar item, the loading conveyor operatively connected to the support structure and configured to travel vertically up and down the support structure between the input feed of the processing machine and the overhead conveyor. The overhead conveyor is positioned above the processing machine and extending between the first and the second opposite ends of the support structure at the top of the support structure. The apparatus further includes a pinch conveyor positioned at the second end of the support structure, the pinch conveyor operatively connected to the support structure and configured to travel vertically up and down the support structure between the overhead conveyor and an input feed of the processing machine. The pinch conveyor has a top portion and a bottom portion, and the top portion and the bottom portion are operatively connected and configured to clamp together to secure the item therebetween. The pinch conveyor is configured to rotate about a pivot as the pinch conveyor travels between the overhead conveyor and the output feed of the processing machine in order to flip the item. The apparatus may further include a loading conveyor motor associated with the loading conveyor configured to selectively drive the loading conveyor in a first direction or a second direction opposite the first direction. The loading conveyor may include a conveyor drive chain operatively connected to the loading conveyor motor and the loading conveyor may be configured such that the loading conveyor motor drives the conveyor drive chain. The apparatus may further include an overhead conveyor motor associated with the overhead conveyor. The overhead conveyor motor may be configured to selectively drive the overhead conveyor. The overhead conveyor may include a conveyor drive chain operatively connected to the overhead conveyor motor and the overhead conveyor may be configured such that the overhead conveyor motor drives the conveyor drive chain. The apparatus may further include a pinch conveyor motor associated with the pinch conveyor, the pinch conveyor motor configured to selectively drive the pinch conveyor in a first direction or a second direction opposite the first direction. The apparatus may further include a sensor associated with the pinch conveyor for determining a thickness of the item when the item is clamped between the top portion and the bottom portion of the pinch conveyor. The apparatus may be a part of a system which includes a processing machine positioned beneath the apparatus. The processing machine may be a sanding machine and the item may be a board or panel.

According to another aspect, an apparatus for use in manufacturing is provided. The apparatus includes a support structure having an input end and a second end opposite the input end, and is configured for positioning over a processing machine, the processing machine for processing an item having a first surface and an opposite second surface wherein both the first surface and the opposite second surface of the item are to be processed with the processing machine in separate passes through the processing machine. The apparatus includes a loading conveyor positioned at the first end of the support structure, the loading conveyor operatively connected to the support structure and configured to travel vertically up and down the support structure between an output feed of the processing machine and the overhead conveyor. The overhead conveyor may be positioned above the processing machine and extend between the first and the second opposite ends of the support structure at the top of the support structure. The apparatus further includes a pinch conveyor positioned at the second end of the support structure, the pinch conveyor operatively connected to the support structure and configured to travel vertically up and down the support structure between the overhead conveyor and the output feed of the processing machine. The pinch conveyor has a top portion and a bottom portion and wherein the top portion and the bottom portion are operatively connected and configured to clamp together to secure the item therebetween. The pinch conveyor is configured to rotate about a pivot as the pinch conveyor travels between the overhead conveyor and the output feed of the processing machine in order to flip the item. The apparatus further includes a control system operatively connected to the loading conveyor, the overhead conveyor, and the pinch conveyor, wherein the control system is configured to operate the apparatus according to a plurality of different states. In a first state within the plurality of different states, the loading conveyor is positioned proximate a bottom of the processing machine and aligned with the output feed of the processing machine. In a second state within the plurality of different states, the loading conveyor transitions upwardly along the support structure. In a third state within the plurality of different states, the loading conveyor is aligned with the overhead conveyor. In a fourth state within the plurality of different states, the pinch conveyor is aligned with the overhead conveyor. In a fifth state within the plurality of different states, the pinch conveyor transitions downwardly along the support structure with the first portion and the second portion of the pinch conveyor clamped together while the pinch conveyor is rotating. In a sixth state within the plurality of different states the pinch conveyor is positioned proximity to the bottom of the support structure to align with an input feed to the processing machine. In a seventh state within the plurality of different states, the pinch conveyor transitions upwardly along the support structure while the pinch conveyor is rotating.

According to another aspect, a method for manufacturing includes providing an apparatus for use in manufacturing. The apparatus may include a support structure having a first end and a second end opposite the first end, and configured for positioning over a processing machine, the processing machine for processing an item having a first surface and an opposite second surface wherein both the first surface and the opposite second surface of the item are to be processed with the processing machine in separate passes through the processing machine. The apparatus may further include a loading conveyor positioned at the first end of the support structure associated with an input feed of the processing machine to receive the item, the loading conveyor operatively connected to the support structure and configured to travel vertically up and down the support structure between the input feed of the processing machine and the overhead conveyor. The overhead conveyor is positioned above the processing machine and extends between the first and the second opposite ends of the support structure at the stop of the support structure. The apparatus further includes a pinch conveyor positioned at an input end of the processing machine to receive the item from an outfeed of the processing machine the pinch conveyor operatively connected to the support structure and configured to travel vertically up and down the support structure between the overhead conveyor and the output feed of the processing machine. The method further includes receiving at the loading conveyor an item for processing. moving the loading conveyor upwardly with the item until the loading conveyor is aligned with the overhead conveyor, conveying the item from the loading conveyor, across the overhead conveyor and to the pinch conveyor, clamping a first portion of the pinch conveyor to a second portion of the pinch conveyor while the item is therebetween to secure the item, moving the pinch conveyor downwardly along the support structure while rotating the pinch conveyor to flip the item until the pinch conveyor is aligned with the input feed of the processing machine, and conveying the item from the pinch conveyor through the input feed of the processing machine. The method may further include processing the otherwise of the item by performing steps of receiving the item onto the loading conveyor after processing the first surface of the item with the processing machine, moving the loading conveyor upwardly with the item until the loading conveyor is aligned with the overhead conveyor, conveying the item from the loading conveyor, across the overhead conveyor and to the pinch conveyor, clamping a first portion of the pinch conveyor to a second portion of the pinch conveyor while the item is therebetween to secure the item, moving the pinch conveyor downwardly along the support structure while rotating the pinch conveyor to flip the item until the pinch conveyor is aligned with the input feed of the processing machine, and conveying the item from the pinch conveyor through the input feed of the processing machine to process the second surface of the item.

BRIEF DESCRIPTION OF THE DRAWINGS

Illustrated aspects of the disclosure are described in detail below with reference to the attached drawing figures, which are incorporated by reference herein.

DETAILED DESCRIPTION

Figure 1:
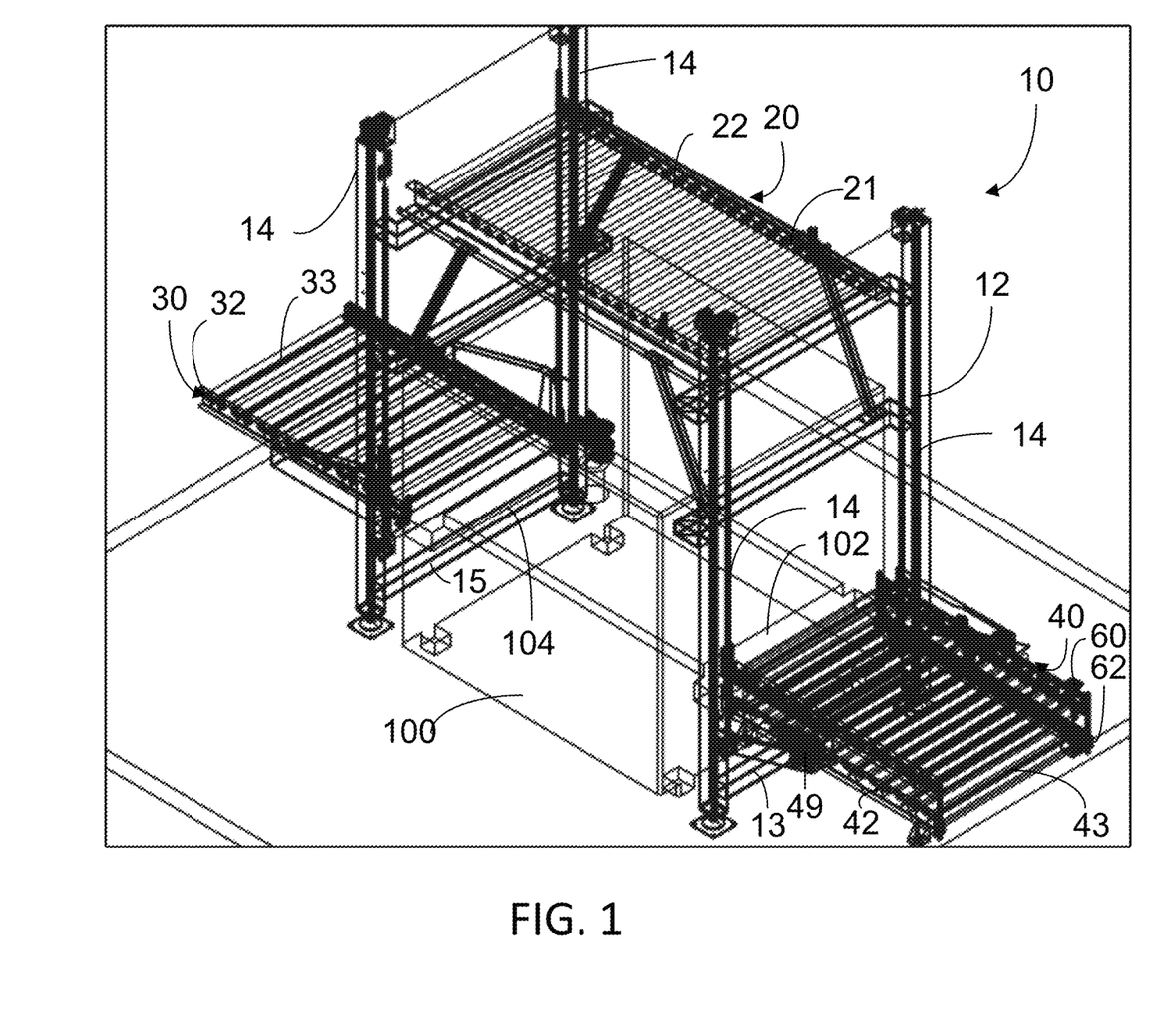
FIG. 1 illustrates a wireframe of an exemplary aspect of the present disclosure.

FIG. 1 is a perspective view of one example of an apparatus 10. The apparatus has a frame or support structure 12 which may include upright supports 14. The support structure 12 has first and second opposite ends 13, 15. The apparatus has an overhead conveyor 20 which is positioned at the top 21 of the support structure 12 and between the first and second opposite ends 13, 15 of the support structure 12. The apparatus 10 further includes a loading conveyor 30 and a pinch conveyor 40.

The support structure 12 may be sized so that a processing machine such as a sanding machine with an input feed and an output feed fits underneath the support structure and to allow the pinch conveyor 40 and the loading conveyor 30 to align with the input feed 102 and output feed 104 of the processing machine 100, respectively.

Both the pinch conveyor 40 and the loading conveyor 30 are configured to be vertically raised and lowered as shown or otherwise. For example, the pinch conveyor 40 and the loading conveyor 30 may be attached along railing systems associated with the upright supports 14 and electric motors or other actuators may be used to drive the sections of conveyor up or down along the support structure 12. In this manner, the pinch conveyor 40 and the loading conveyor 30 may be lifted to be in alignment with the overhead conveyor 20 or lowered to align with an input feed 102 or output feed 104 of the processing machine 100.

Each of the conveyors may include a roller chain 22, 32, 42 which may be formed from a plurality of cylindrical rollers 33 linked together by side links and forming a continuous loop. Each of the roller chains 22, 32, 42 may be engaged and driven by sprockets, which may be toothed wheels affixed to a drive shaft. These sprockets may be operatively connected to a motor or other actuator which may be an electric or hydraulic motor.

In addition, the pinch conveyor 40 is configured such that its first and second portions 60, 62 clamp together so as to sandwich an item such as a board or panel positioned therebetween so that the item is secured in place during the flipping. In addition, the clamping together allows for the thickness of the item to be determined which may be used in determining appropriate settings for the processing machine 100. The pinch conveyor 40 rotates about a pivot 49 while the pinch conveyor 40 travels vertically upward or downward the support structure 12 allowing the pinch conveyor 40 to flip.

Thus, in operation, an operator positioned at the first end 15 of the loading conveyor 30 may place a board, panel, or other generally planar item onto the loading conveyor 30. The loading conveyor 30 lifts up into alignment with the overhead conveyor 20. At the same time, the pinch conveyor 40 may also be lifted up into alignment with the overhead conveyor 20. The loading conveyor 30 activates to power the item onto the overhead conveyor 20. The overhead conveyor 20 activates to power the item onto the pinch conveyor 40. The pinch conveyor 40 clamps the item between the first portion 60 and the second portion 62 and flips the item as the pinch conveyor 40 is lowered to the processing machine 100. At the same time, the loading conveyor 30 may also be lowered. The clamping of the item secures the item in place so that it can be flipped end over end. The clamping operation allows the pinch conveyor 40 to determine the thickness of the item and automatically adjust the processing machine 100 to the correct thickness for the item when the pinch conveyor 40 reaches the height of the processing machine 100, the processing machine 100 may be pre-set to the proper thickness of the item and the item will be released and fed into the processing machine 100. The pinch conveyor 40 includes a pivot 49 defining a pivot axis and the pinch conveyor 40 pivots about the pivot axis while it is being lowered or raised.

When the item exits the processing machine 100, the operator may inspect the face or top side of the item. For example, when the processing machine 100 is a sanding machine, the operator may inspect the top surface of the item to ensure that it was properly sanded without needing to turn the item over. After the first pass, the process may be repeated in order to process the other side of the item. After inspection, the item may then be transferred without manually turning it over to the next stage in the manufacturing process. For example, in furniture manufacturing where the item is a board or panel, the next stage may be a CNC machine where the board or panel may have a pattern cut out which is assembled with other pieces in order to form an article of furniture.

Thus, a single operator may feed boards into the sanding machine, flip them, and inspect them while remaining in the same position near the output feed of the sanding machine without needing to travel around the machine or carry the board around the machine.

Figure 2:
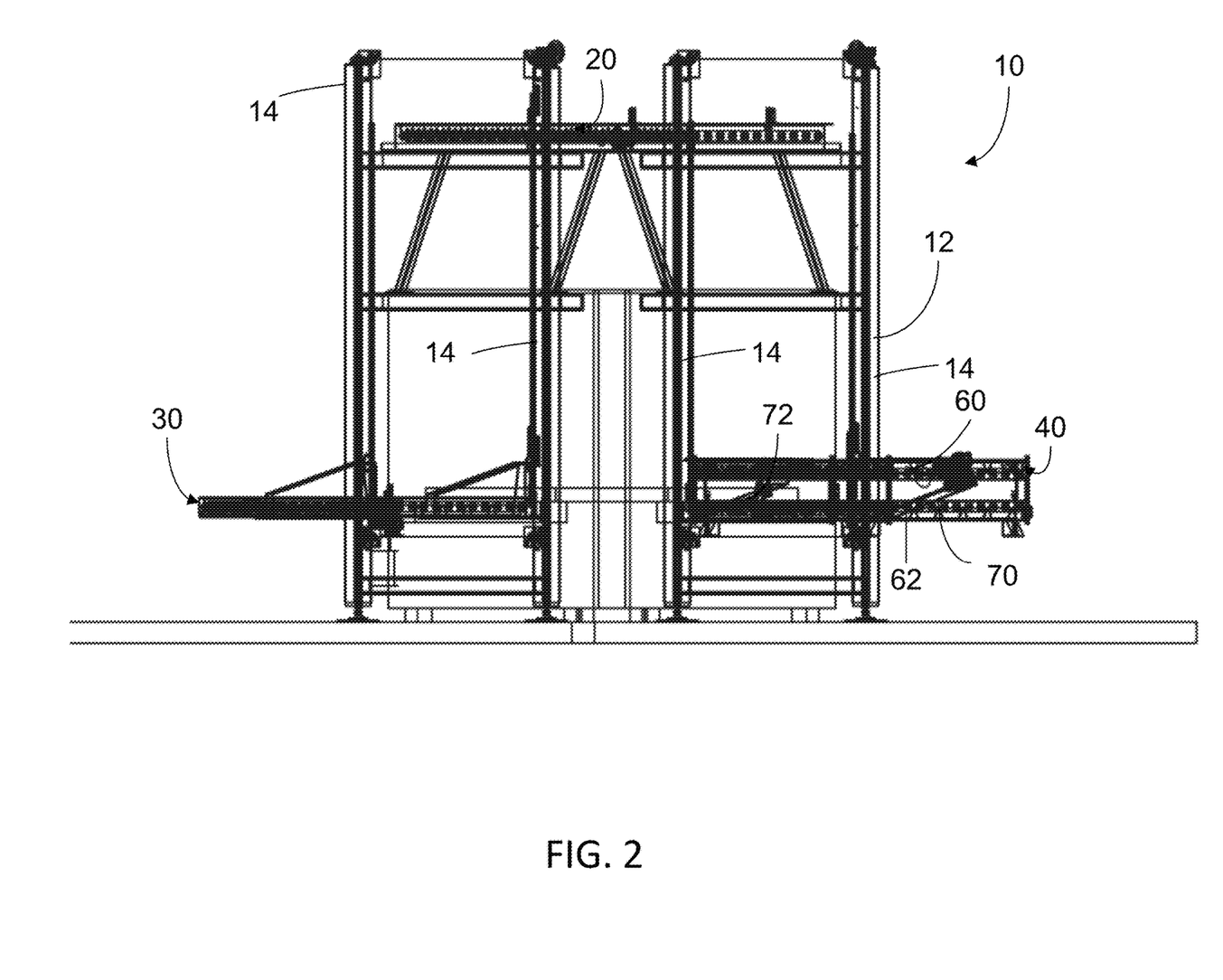
FIG. 2 illustrates a wireframe of a front view.

FIG. 2 is a side view which further illustrates the apparatus to further show the relationship between the overhead conveyor 20, the loading conveyor 30, and the pinch conveyor 40. The first portion 60 and the second portion 62 of the pinch conveyor 40 may be clamped together using hinge members 70, 72 operatively connected therebetween.

Figure 3:
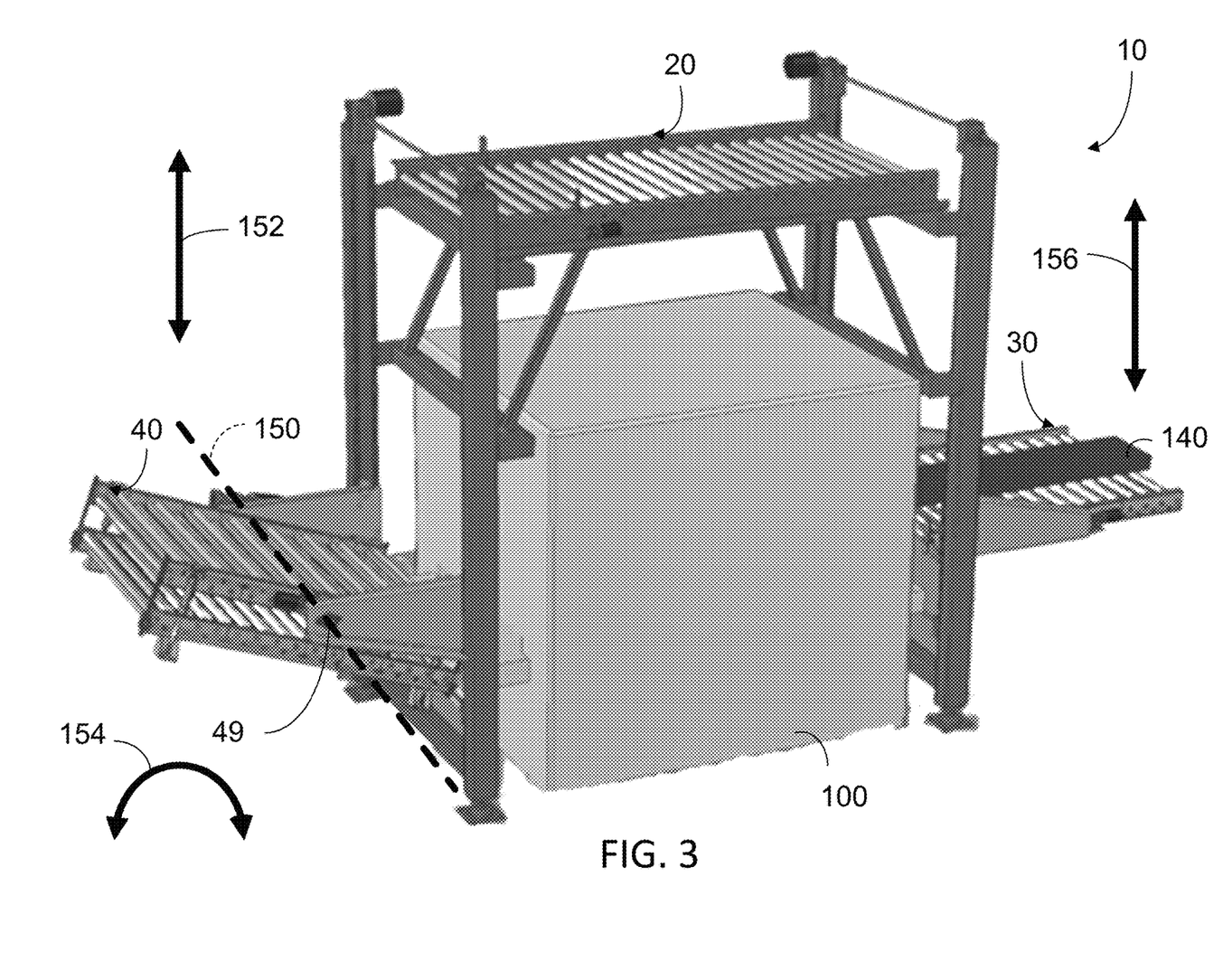
FIG. 3 is a perspective view.

FIG. 3 is a perspective view which illustrates the apparatus 10 when installed with a processing machine 100 having an input feed 102 and an output feed 104 and when an item 140 such as a board is being processed. FIG. 3 further shows the pivot axis 150 along which the pivot 49 pivots or rotates. Arrow 154 indicates rotational movement associated with the pinch conveyor 40 as it rotates. Arrow 152 illustrates vertical movement up or down an axis for the pinch conveyor 40. Arrow 156 indicates vertical movement up or down an axis for the loading conveyor 30.

Figure 4:
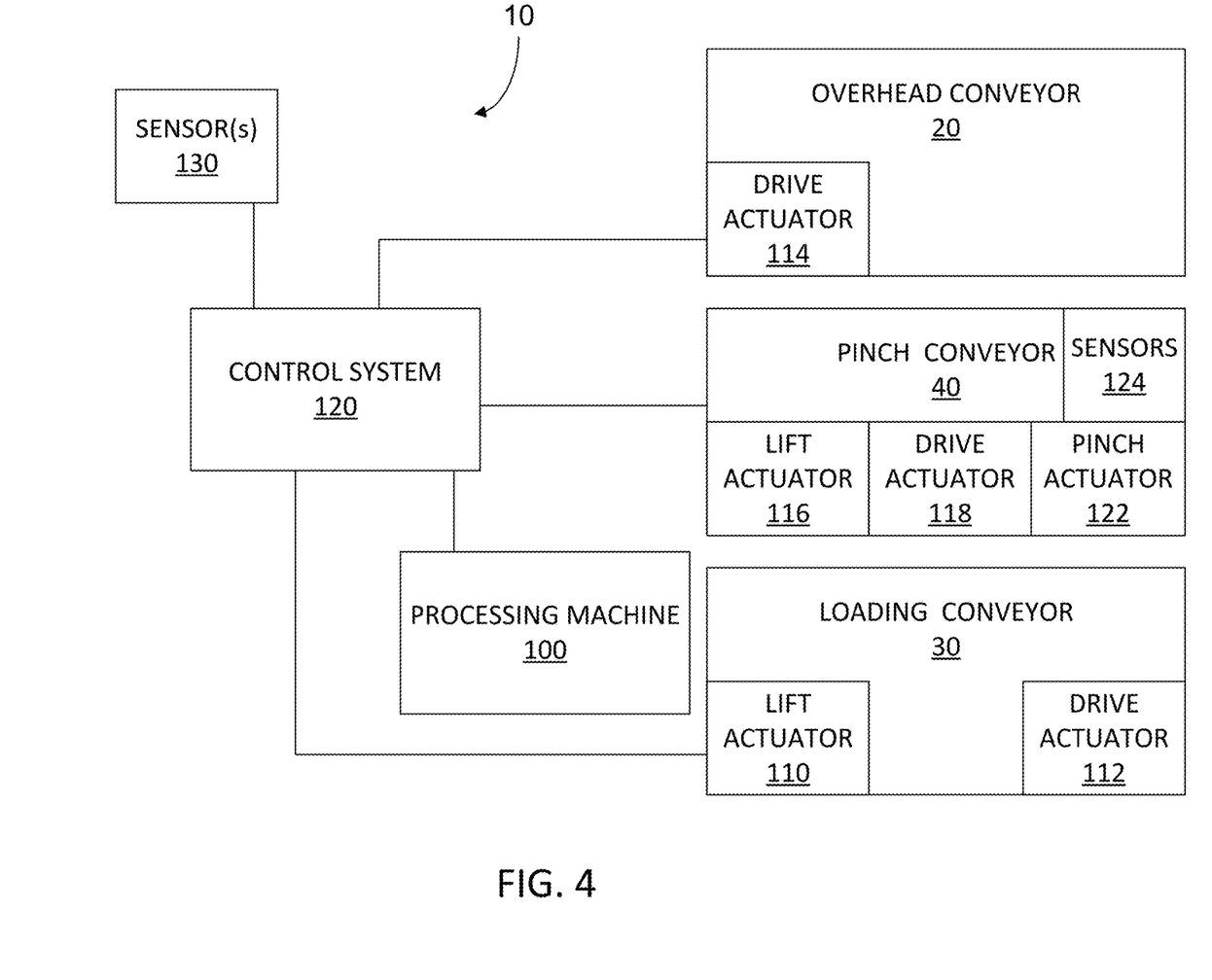
FIG. 4 is a block diagram.

FIG. 4 is a block diagram showing a system which includes the apparatus 10 which includes an overhead conveyor 20, a loading conveyor 30, and a pinch conveyor 40. The loading conveyor 30 may include a lift actuator 110 for lifting the loading conveyor vertically upward and downward along the support structure. In addition, the loading conveyor 30 includes a drive actuator 112 which may be a motor such as an electric motor or other type of actuator for moving the loading conveyor 30 in a first direction or an opposite second direction so that an item on the loading conveyor 30 moves in a first direction or an opposite second direction. The overhead conveyor 20 may include a drive actuator 114 for moving the overhead conveyor 20 in a first direction or opposite second direction. The pinch conveyor 40 may include a lift actuator 116 for lifting the pinch conveyor 40 vertically upward and downward along the support structure while rotating the pinch conveyor 40 about a pivot. The pinch conveyor 40 may further include a drive actuator 118 for moving the pinch conveyor in a first direction or an opposite direction. The pinch conveyor may further include a pinch actuator 122 for clamping a first portion of the pinch conveyor and a second portion of the pinch conveyor together. One or more sensors 124 may be associated with the pinch conveyor 40 to measure thickness of the item clamped between the first and second portions of the pinch conveyor. The sensor may be of any number of different types, including position switches, optical sensors, ultrasonic sensor, capacitive sensors, contact potentiometers, strain gauges, load cells, piezoelectric sensors, hall effect sensors, or other types of sensors which determine the distance based on changes in a physical quality, optical quality, or otherwise.

Based on the measured thickness, settings on a processing machine 100 may be adjusted. For example, where the processing machine 100 is a sanding machine, based on the thickness of the item to be sanded determined by the pinch conveyor 40 or sensors 124 associated therewith, settings on the processing machine 100 may be automatically adjusted.

The control system 120 may include a processor, microcontroller, or other type of control logic for controlling the process. In addition, to the sensor(s) 124, other types of sensors 130 may be used. For example, laser curtains may be placed at both the input feed and the output feed of the processing machine to monitor the item entering and exiting the sanding machine. Other sensors such as contact sensors or switches may be placed throughout the apparatus to monitor the presence or absence of the item. In addition, the control system may control any number of different actuators associated with the different conveyors including raising, lowering, or rotating the conveyors as well as to activate the conveyors in a forward or reverse direction.

The control system 120 may be used to monitor and control different states of the system. Different states may include a first state where the loading conveyor is positioned proximate a bottom of the processing machine and aligned with an output feed of the processing machine. A second state may be the state in which the loading conveyor transitions upwardly along the support structure. A third state may be the state in which the loading conveyor is aligned with the overhead conveyor. A fourth state may be the state in which the pinch conveyor is aligned with the overhead conveyor. The third state and the fourth state may occur at the same time. A fifth state may be when the pinch conveyor transitions downwardly along the support structure with the top portion and the bottom portion of the pinch conveyor clamped together while the pinch conveyor is rotating. The loading conveyor may also be traveling downwardly at the same time. A sixth state may be when the pinch conveyor is positioned proximate a bottom of the support structure to align with an input feed to the processing machine. The loading conveyor may also be aligned with an output feed from the processing machine at the same time. In a seventh state, the pinch conveyor transitions upwardly along the support structure while the pinch conveyor is rotating. The seventh state may occur at the same time as the second state.

In addition to states being defined by the position or movement of the different conveyors, it is to be understood that the pinch conveyor and the loading conveyor may rotate in both directions so that items may be moved across these conveyors in either direction. With respect to the overhead conveyor, only one direction of travel is needed, although multiple directions of travel could be provided if desired.

Figure 5:
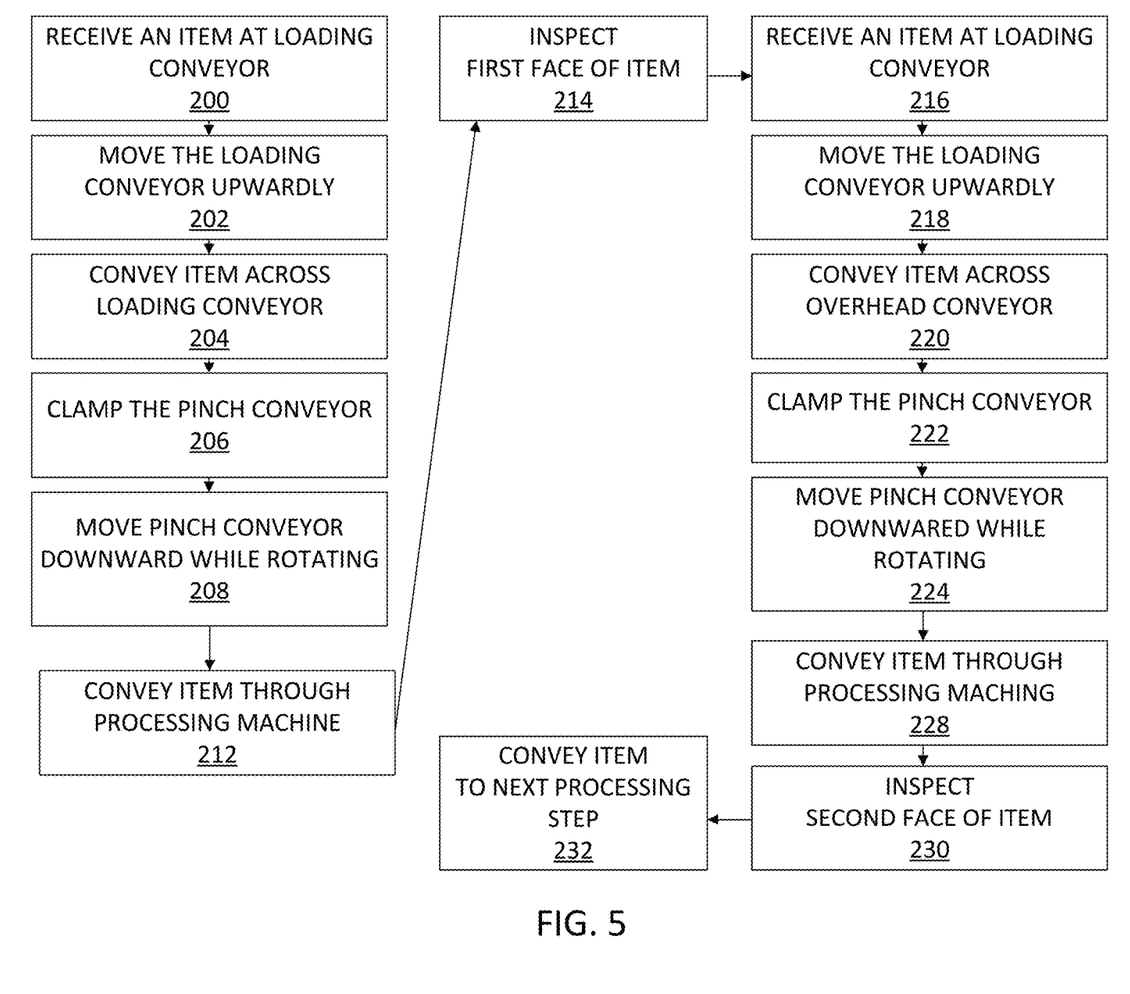
FIG. 5 is a flow chart.

FIG. 5 illustrates one example of a process. In step 200, an item is received at the loading conveyor. In step 202, the loading conveyor is moved upwardly until it is aligned with the overhead conveyor. In step 204, the item is conveyed from the loading conveyor across the overhead conveyor to the pinch conveyor. In step 206, a first portion of the pinch conveyor and a second portion of the pinch conveyor are clamped together while the item is sandwiched therebetween to secure the item. In step 208, the pinch conveyor moves downwardly along the support structure while rotating the pinch conveyor to flip the item until the pinch conveyor is aligned with the input feed of the processing machine. In step 212, the item is conveyed from the pinch conveyor through the input feed of the processing machine.

In step 214, the first face of the item may be inspected by an operator which may occur at the same time as it is received at the loading conveyor in step 216. In step 218, the loading conveyor moves upwardly until the loading conveyor is aligned with the overhead conveyor. In step 220, the item is conveyed from the loading conveyor across the overhead conveyor to the pinch conveyor. In step 222, the pinch conveyor clamps a first portion of the pinch conveyor and a second portion of the pinch conveyor while the item is sandwiched therebetween in order to secure the item. In step 224, the pinch conveyor moves downwardly along the support structure while rotating about a pivot in order to flip the item until has flipped and the pinch conveyor is aligned with the input feed of the processing machine. In step 228, the item may be conveyed from the pinch conveyor through the input feed of the processing machine to process the second surface of the item. In step 230, the second face of the item may be inspected by an operator. Then, where the item passes inspection in step 232, the item may be conveyed to a next step in a manufacturing process.

As used herein the term "planar" when describing an item should be understood to mean an item with a generally planar top and bottom surfaces, however neither surface need be perfectly planar. For example, a board or panel used in furniture manufacturing would be understood to be planar before, during, or after sanding.

As used herein the term "aligned" when describing the relationships between conveyors or a processing machine should be understood to mean that the conveyors need not be perfectly aligned but are sufficiently aligned so that an item being conveyed may pass between two conveyors, or between a conveyor and a processing machine, or between the processing machine and a conveyor.

As used herein, the singular forms "a," "an" and "the" include plural referents unless the context clearly dictates otherwise. Thus, for example, reference to "a sensor" includes a plurality of such sensors.

As used herein, the terms "first", "second", "third", "fourth", "fifth", "sixth", "seventh", and the like in the description and in the claims, if any, are used for distinguishing between similar elements or functions and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

Occurrences of the phrase "in one embodiment," or "in one aspect," herein do not necessarily all refer to the same embodiment or aspect.

As used herein the term, "proximate" means at, nearly at, close to or neighboring when describing a location. For example, a structure which is "proximate" a top is closer to the top than the bottom, usually much closer, and may even be at the top or past the top. The exact allowable degree of deviation may in some cases depend on the specific context.

As used herein, the term "substantially" refers to the complete or nearly complete extent or degree of an action, characteristic, property, state, structure, item, or result. For example, an object that is "substantially" aligned would mean that the object is either fully aligned or nearly fully aligned. The exact allowable degree of deviation from absolute completeness may in some cases depend on the specific context. However, generally speaking the nearness of completion will be so as to have the same overall result as if absolute and total completion were obtained.

The disclosure is not to be limited to the particular aspects described herein. In particular, the disclosure contemplates numerous variations in the specific structure and function. For example, it is contemplated that different types of conveyors may be used, the support structure may have differences in size, shape, and geometry, the control system may include any number of different sensors and/or actuators, and any number of other options, variations, and alternatives are contemplated. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes or methods of the disclosure. It is understood that any other modifications, substitutions, and/or additions can be made, which are within the intended spirit and scope of the disclosure.

What is claimed is:

1. An apparatus for use in manufacturing, the apparatus comprising:
   a support structure having a top, a bottom, a first end and a second end opposite the first end, and configured for positioning over a processing machine, the processing machine for processing an item having a first surface and an opposite second surface wherein both the first surface and the opposite second surface of the item are to be processed with the processing machine in separate passes through the processing machine;
   a loading conveyor positioned at the first end of the support structure to receive the item, the loading conveyor associated with an output feed of the processing machine, the loading conveyor operatively connected to the support structure and configured to travel vertically up and down the support structure between the output feed of the processing machine and an overhead conveyor;
   the overhead conveyor positioned above the processing machine and extending between the first end and the second end of the support structure at the top of the support structure;
   a pinch conveyor positioned at the second end of the support structure, the pinch conveyor operatively connected to the support structure and configured to travel vertically up and down the support structure between the overhead conveyor and an input feed of the processing machine;
   wherein the pinch conveyor has a top portion and a bottom portion and wherein the top portion and the bottom portion are operatively connected and configured to clamp together to secure the item therebetween; and
   wherein the pinch conveyor is configured to rotate about a pivot as the pinch conveyor travels between the overhead conveyor and the input feed of the processing machine in order to flip the item.

2. The apparatus of claim 1 further comprising a loading conveyor motor associated with the loading conveyor configured to selectively drive the loading conveyor in a first direction or a second direction opposite the first direction.

3. The apparatus of claim 2 wherein the loading conveyor comprises a conveyor drive chain operatively connected to the loading conveyor motor and wherein the loading conveyor is configured such that the loading conveyor motor drives the conveyor drive chain.

4. The apparatus of claim 1 further comprising an overhead conveyor motor associated with the overhead conveyor, the overhead conveyor motor configured to selectively drive the overhead conveyor.

5. The apparatus of claim 4 wherein the overhead conveyor comprises a conveyor drive chain operatively connected to the overhead conveyor motor and wherein the overhead conveyor is configured such that the overhead conveyor motor drives the conveyor drive chain.

6. The apparatus of claim 1 further comprising a pinch conveyor motor associated with the pinch conveyor, the pinch conveyor motor configured to selectively drive the pinch conveyor in a first direction or a second direction opposite the first direction.

7. The apparatus of claim 6 further comprising a sensor associated with the pinch conveyor for determining a thickness of the item when the item is clamped between the top portion and the bottom portion of the pinch conveyor.

8. A system comprising the processing machine with the apparatus of claim 1 wherein the processing machine is positioned under the apparatus.

9. The system of claim 8 wherein the processing machine is a sanding machine and wherein the item is at least one of a board and a panel.

10. An apparatus for use in manufacturing, the apparatus comprising:
   a support structure having a first end and a second end opposite the first end, the support structure configured for positioning over a processing machine, the processing machine for processing an item having a first surface and an opposite second surface wherein both the first surface and the opposite second surface of the item are to be processed with the processing machine in separate passes through the processing machine;
   a loading conveyor positioned at the first end of the support structure associated with an input feed of the processing machine to receive the item, the loading conveyor operatively connected to the support structure and configured to travel vertically up and down the support structure between the input feed of the processing machine and an overhead conveyor;
   the overhead conveyor positioned above the processing machine and extending between the first end and the second end of the support structure at a top of the support structure;
   a pinch conveyor positioned at the second end of the support structure, the pinch conveyor operatively connected to the support structure and configured to travel vertically up and down the support structure between the overhead conveyor and an input feed of the processing machine;
   wherein the pinch conveyor has a top portion and a bottom portion and wherein the top portion and the bottom portion are operatively connected and configured to clamp together to secure the item therebetween;
   wherein the pinch conveyor is configured to rotate about a pivot as the pinch conveyor travels between the overhead conveyor the input feed of the processing machine in order to flip the item;
   a control system operatively connected to the loading conveyor, the overhead conveyor, and the pinch conveyor, wherein the control system is configured to operate the apparatus according to a plurality of different states;
   wherein in a first state within the plurality of different states, the loading conveyor is positioned proximate a bottom of the processing machine and aligned with an output feed of the processing machine;

wherein in a second state within the plurality of different states, the loading conveyor transitions upwardly along the support structure;

wherein in a third state within the plurality of different states, the loading conveyor is aligned with the overhead conveyor;

wherein in a fourth state within the plurality of different states, the pinch conveyor is aligned with the overhead conveyor;

wherein in a fifth state within the plurality of different states, the pinch conveyor transitions downwardly along the support structure with the top portion and the bottom portion of the pinch conveyor clamped together while the pinch conveyor is rotating;

wherein in a sixth state within the plurality of different states the pinch conveyor is positioned proximate a bottom of the support structure to align with an input feed to the processing machine; and wherein in a seventh state within the plurality of different states, the pinch conveyor transitions upwardly along the support structure while the pinch conveyor is rotating.

11. The apparatus of claim 10 further comprising a loading conveyor motor associated with the loading conveyor configured to selectively drive the loading conveyor in a first direction or a second direction opposite the first direction.

12. The apparatus of claim 11 wherein the loading conveyor comprises a conveyor drive chain operatively connected to the loading conveyor motor and wherein the loading conveyor is configured such that the loading conveyor motor drives the conveyor drive chain.

13. The apparatus of claim 10 further comprising an overhead conveyor motor associated with the overhead conveyor, the overhead conveyor motor configured to selectively drive the overhead conveyor in a first direction or a second direction opposite the first direction.

14. The apparatus of claim 13 wherein the overhead conveyor comprises a conveyor drive chain operatively connected to the overhead conveyor motor and wherein the overhead conveyor is configured such that the overhead conveyor motor drives the conveyor drive chain.

15. The apparatus of claim 10 further comprising a pinch conveyor motor associated with the pinch conveyor, the pinch conveyor motor configured to selectively drive the pinch conveyor in a first direction or a second direction opposite the first direction.

16. The apparatus of claim 15 further comprising a sensor associated with the pinch conveyor for determining a thickness of the item when the item is clamped between the top portion and the bottom portion of the pinch conveyor.

17. A method for manufacturing, the method comprising:
providing an apparatus for use in manufacturing, the apparatus comprising:
(a) a support structure having a first end and a second end opposite the first end, and configured for positioning over a processing machine, the processing machine for processing an item having a first surface and an opposite second surface wherein both the first surface and the opposite second surface of the item are to be processed with the processing machine in separate passes through the processing machine;
(b) a loading conveyor positioned at the first end of the support structure associated with an input feed of the processing machine to receive the item, the loading conveyor operatively connected to the support structure and configured to travel vertically up and down the support structure between the input feed of the processing machine and an overhead conveyor;
(c) the overhead conveyor positioned above the processing machine and extending between the first end and the second end of the support structure at a top of the support structure;
(d) a pinch conveyor positioned at an input end of the processing machine to receive the item from an outfeed of the processing machine the pinch conveyor operatively connected to the support structure and configured to travel vertically up and down the support structure between the overhead conveyor and the input feed of the processing machine;

receiving at the loading conveyor an item for processing;

moving the loading conveyor upwardly with the item until the loading conveyor is aligned with the overhead conveyor;

conveying the item from the loading conveyor, across the overhead conveyor and to the pinch conveyor;

clamping a first portion of the pinch conveyor to a second portion of the pinch conveyor while the item is therebetween to secure the item;

moving the pinch conveyor downwardly along the support structure while rotating the pinch conveyor to flip the item until the pinch conveyor is aligned with the input feed of the processing machine; and conveying the item from the pinch conveyor through the input feed of the processing machine.

18. The method of claim 17 further comprising:
receiving the item onto the loading conveyor after processing the first surface of the item with the processing machine;

moving the loading conveyor upwardly with the item until the loading conveyor is aligned with the overhead conveyor;

conveying the item from the loading conveyor, across the overhead conveyor and to the pinch conveyor;

clamping a first portion of the pinch conveyor to a second portion of the pinch conveyor while the item is therebetween to secure the item;

moving the pinch conveyor downwardly along the support structure while rotating the pinch conveyor to flip the item until the pinch conveyor is aligned with the input feed of the processing machine; and conveying the item from the pinch conveyor through the input feed of the processing machine to process the second surface of the item.

19. The method of claim 18 wherein the processing machine is a sanding machine for sanding the item.

20. The method of claim 18 wherein the item comprises one of a board and a panel.

* * * * *